Aug. 19, 1930.  R. W. GRISWOLD, 2D  1,773,357
FABRICATED TUBULAR STRUCTURE AND METHOD OF FORMING THE SAME
Filed Feb. 19, 1929  2 Sheets-Sheet 1
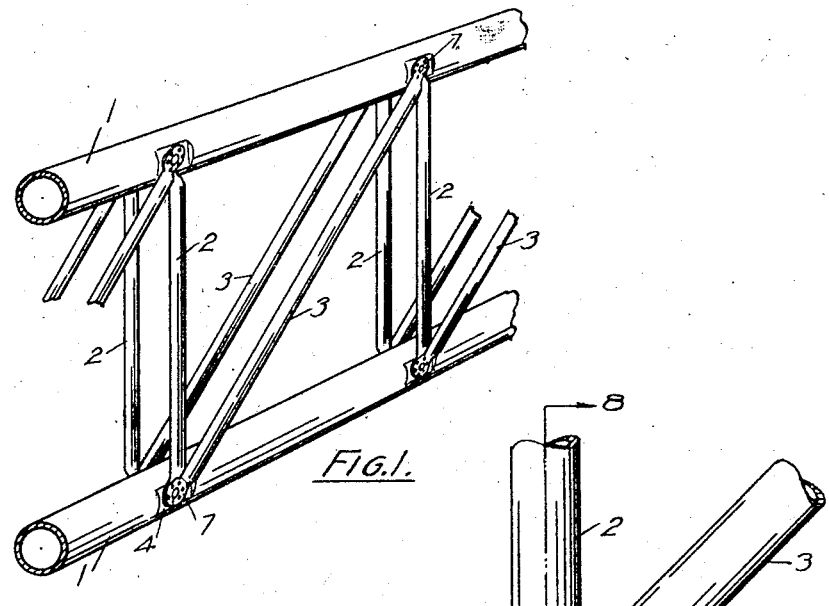
FIG.1.
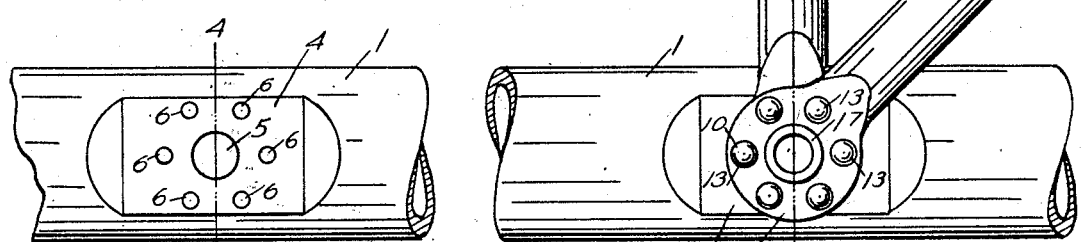
FIG.3.  FIG.2.
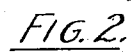
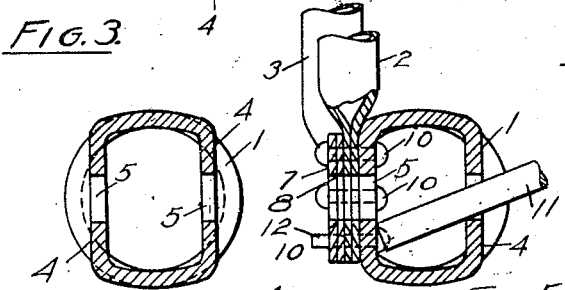
FIG.4.  FIG.5.
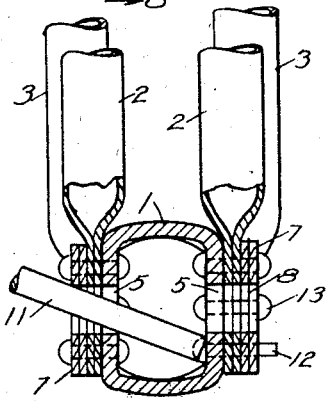
FIG.6.
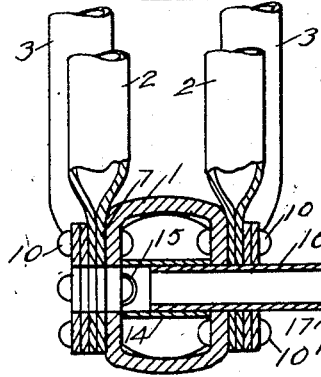
FIG.7.
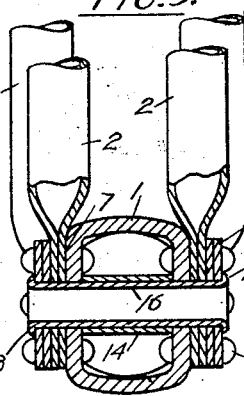
FIG.8.  FIG.9.
INVENTOR.
Roger W. Griswold II
BY
ATTORNEYS.

Aug. 19, 1930.   R. W. GRISWOLD, 2D   1,773,357
FABRICATED TUBULAR STRUCTURE AND METHOD OF FORMING THE SAME
Filed Feb. 19, 1929   2 Sheets-Sheet 2

Roger W. Griswold II
INVENTOR.

BY
ATTORNEYS.

Patented Aug. 19, 1930

1,773,357

UNITED STATES PATENT OFFICE

ROGER W. GRISWOLD, 2D, OF HUNTINGTON, NEW YORK

FABRICATED TUBULAR STRUCTURE AND METHOD OF FORMING THE SAME

Application filed February 19, 1929. Serial No. 341,088.

In tubular structures, particularly such as are used in aeroplane manufacture difficulty has been experienced in connecting tubes with the adjoining walls. This is particularly true of such tubes that do not readily lend themselves to welding. The present invention is directed to a simplification of means and method of joining tubes to an attached wall. Features and details of the invention will appear from the specification and claims.

A preferred embodiment of the invention is illustrated in the accompanying drawings as follows:—

Fig. 1 shows a perspective view of a truss tubular structure.

Fig. 2 an enlarged view of one of the tube joints.

Fig. 3 an elevation of a portion of tube prepared for the joint.

Fig. 4 a section on the line 4—4 in Fig. 3.

Fig. 5 a section on the line 4—4 showing a joint in process of fabrication securing branch tubes to one wall of the main tube.

Fig. 6 a similar view showing the securing of branch tubes on the opposite wall.

Fig. 7 a similar section showing the introduction of a cross tubular rivet and spacing tube.

Fig. 8 a section of the completed joint, on the line 8—8 in Fig. 2.

Fig. 9 shows an elevation of a flattened end of a branch tube.

Figure 10:
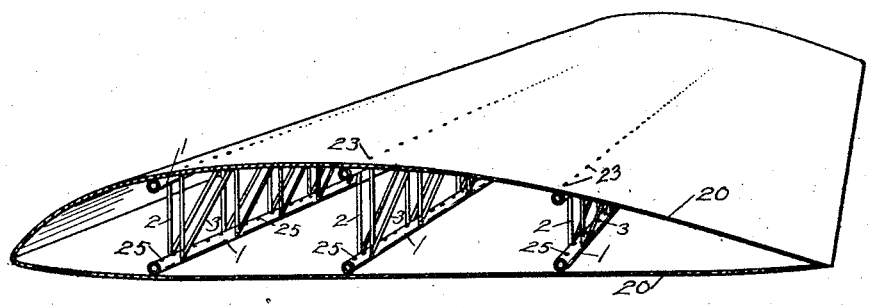

Fig. 10 a sectional view of an aeroplane wing showing the skin structure and the interior truss frames.

Figure 11:
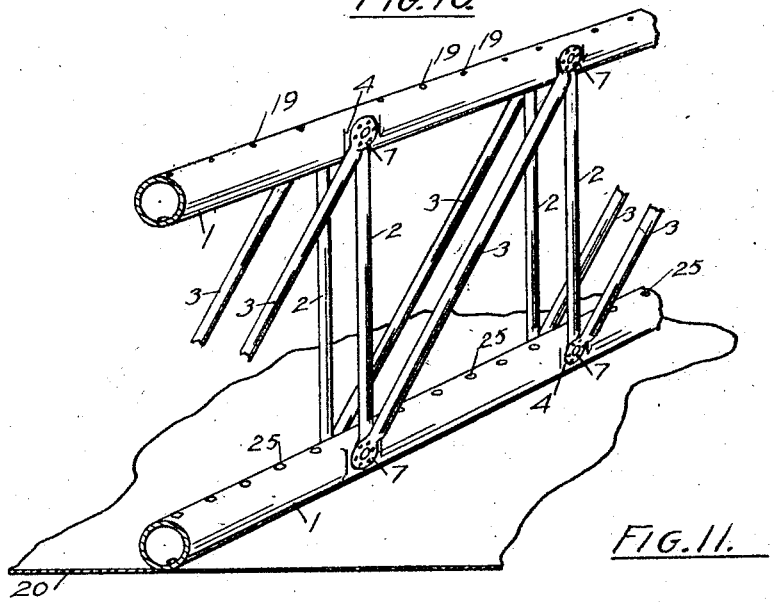

Fig. 11 an enlarged perspective view of a portion of such wing.

Figure 12:
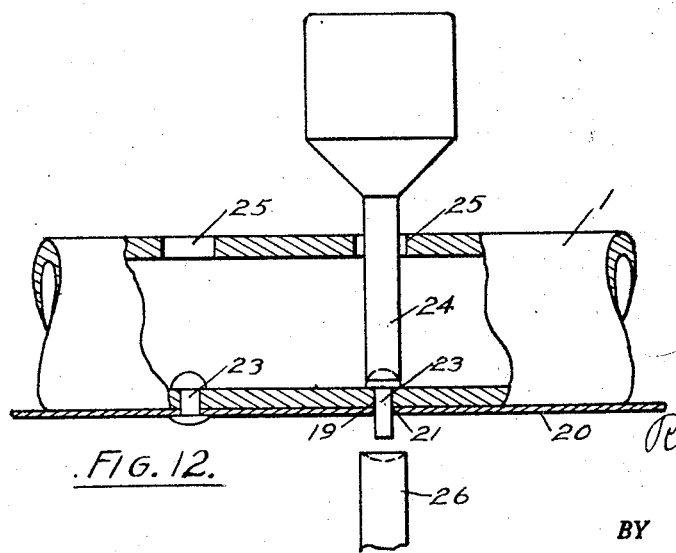

Fig. 12 a sectional view of one of the wing tubes and skin showing the manner of securing the rivets.

1 marks the main, or longitudinal tubes, 2 struts extending from the main, or longitudinal tubes, and 3 brace tubes. The brace and strut tubes are arranged each side of the main tube, the main tube being preferably flattened at 4 to receive these branch tubes. The main tube has working openings 5 extending through flattened portions and surrounding these openings are arranged a series of rivet openings 6. The branch tubes have flattened ends 7 with openings 8 adapted to register with the working openings 5 and rivet openings 9 to register with the openings 6.

With the tubes placed in position at one side of the flats, as shown in Fig. 5, rivets 10 are introduced to the rivet openings and a backing tool 11 is inserted through the opposite working opening backing the rivets so that an end 12 may be properly headed as at 13.

At the completion of securing the branch tubes at one side of the main tube a similar operation is performed, as shown in Fig. 6 at the opposite side. A spacing tube 14 is inserted from the end of the main tube, this preferably having cut-out portions 15 to clear the heads of the rivets 11 and at various flats through which it may be passed is brought into register with the working openings and a rivet 16, preferably tubular, is introduced through all the working openings and both sides of the main tube. This tubular rivet has a head 17 formed upon it and is headed over at its opposite end at 18 completing the joint, as clearly shown in Fig. 8. In using the trusses thus formed they are arranged within the wing skin in the usual manner. The main tubes have rivet openings 19 and the skin 20 rivet openings 21 which register with the rivet holes 19. Rivets 23 are arranged in the rivet holes and a dolly, or backing tool 24 is inserted through an opening 25 backing a rivet in the opening 19 and the rivet is headed up with a riveting tool 26. In this way the tube structure may be very securely attached to the adjacent walls.

What I claim as new is:—

1. In a fabricated tubular structure, the combination of a main tube; a branch tube, said tubes having registering rivet holes through their walls and the main tube having a working opening; and a rivet through the rivet hole, the inner end of the rivet in the main tube being in position to be reached by a tool inserted through the working opening.

2. In a fabricated tubular structure, the combination of a tube having opposite portions of its walls flattened the flattened portions being parallel; rivet openings in these flattened walls; working openings in these flattened walls; attached walls having rivet openings registering with the rivet openings in the flattened walls; and rivets in said openings, the inner ends of the rivets for both flattened walls being in position to be backed by a tool inserted through the working openings.

3. In a fabricated tubular structure, the combination of a tube having opposing flattened walls; branch tubes having flattened portions engaging said walls, said flattened portions and said branch tubes having registering rivet openings and working openings; and rivets in the rivet openings, the inner ends of the rivets being in position to be reached by a tool inserted through the working openings.

4. In a fabricated tubular structure, the combination of a tube having opposing flattened walls; branch tubes having flattened portions engaging said walls, said flattened portions and said branch tubes having registering rivet openings and working openings; rivets in the rivet openings, the inner ends of the rivets being in position to be reached by a tool inserted through the working openings; and a rivet extending through both flattened walls and attached wall.

5. In a fabricated tubular structure, the combination of a main tube having opposing flattened portions; struts; branch tubes having flattened ends engaging said flattened portions, said flattened portions and said flattened ends having registering rivet openings and registering working openings; and rivets in the rivet openings, the inner ends of the rivets being in position to be reached by a tool inserted through the openings.

6. In a fabricated tubular structure, the combination of a main tube having opposing flattened portions; struts; brace tubes having flattened ends engaging said flattened portions, said flattened portions and said flattened ends having registering rivet openings and registering working openings; rivets in the rivet openings, the inner ends of the rivets being in position to be reached by a tool inserted through the openings; and a rivet extending through the working openings.

7. In an aeroplane wing structure, the combination of a wing skin; a tubular frame within the skin, the tubes of said frame and skin having registering rivet holes and the tubes having working openings adjacent the rivet holes; and rivets extending through the wall of the tube and the skin, the inner ends of the rivets being in position to be reached by a tool inserted through the working openings.

8. In an aeroplane wing structure, the combination of a wing skin; a tubular frame within the skin, the tubes of said frame and skin having registering rivet holes and the tubes having working openings adjacent the rivet holes; rivets extending through the wall of the tube and the skin, the inner ends of the rivets being in position to be reached by a tool inserted through the working openings, said tubes having laterally extending rivet openings with adjacent working openings; branch tubes having registering rivet openings; rivets in said last-mentioned openings, the inner ends of the rivets being in position to be reached by a tool inserted in the working opening.

9. In an aeroplane wing structure, the combination of a wing skin; a tubular frame within the skin, the tubes of the frame having opposing flats at right angles to the skin; rivet holes through the flats and through the faces adjacent to the skin and working openings adjacent to the rivet holes; branch tubes having registering rivet openings at the flats; and rivets through said rivet openings, the inner ends of the rivets being in position to be reached by a tool inserted through the working openings.

10. In an aeroplane wing structure, the combination of a wing skin; a tubular frame within the skin, the main tubes of the frame having opposing flattened portions in planes at angles to the skin; branch tubes engaging said flattened portions said tubes having registering rivet openings and working openings through the branch tubes, and said flattening portions of the main tubes adjacent to the rivet openings; and rivets in said openings, the inner ends of the rivets being in position to be reached by a tool inserted through the working openings.

11. In an aeroplane wing structure, the combination of a wing skin; a tubular frame within the skin, the main tubes of the frame having opposing flattened portions in planes at angles to the skin; branch tubes engaging said flattened portions said tubes having registering rivet openings and working openings through the branch tubes, and said flattened portions of the main tubes adjacent to the rivet openings; rivets in said openings, the inner ends of the rivets being in position to be reached by a tool inserted through the working openings; and rivets extending through the working openings of the branch tubes and flattened walls.

In testimony whereof I have hereunto set my hand.

ROGER W. GRISWOLD, II.